(12) United States Patent
Suzuki et al.

(10) Patent No.: US 10,356,314 B2
(45) Date of Patent: Jul. 16, 2019

(54) IMAGE SENSOR AND IMAGE CAPTURING APPARATUS

(71) Applicant: CANON KABUSHIKI KAISHA, Tokyo (JP)

(72) Inventors: Satoshi Suzuki, Tokyo (JP); Shigeru Ichikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/353,103

(22) Filed: Nov. 16, 2016

(65) Prior Publication Data

US 2017/0150042 A1   May 25, 2017

(30) Foreign Application Priority Data

Nov. 25, 2015 (JP) ................. 2015-230028
Sep. 8, 2016 (JP) ................. 2016-175882

(51) Int. Cl.
| | |
|---|---|
| *H04N 5/232* | (2006.01) |
| *H04N 5/225* | (2006.01) |
| *H04N 5/378* | (2011.01) |
| *H04N 9/73* | (2006.01) |
| *H04N 5/335* | (2011.01) |
| *H04N 5/369* | (2011.01) |

(52) U.S. Cl.
CPC ....... *H04N 5/23229* (2013.01); *H04N 5/2258* (2013.01); *H04N 5/23245* (2013.01); *H04N 5/335* (2013.01); *H04N 5/378* (2013.01); *H04N 5/379* (2018.08); *H04N 9/735* (2013.01)

(58) Field of Classification Search
CPC .... H04N 5/23229; H04N 5/378; H04N 9/735; H04N 5/2258; H04N 5/23245
USPC ........................... 348/222.1, 370–373
See application file for complete search history.

(56) References Cited

U.S. PATENT DOCUMENTS

| | | | | |
|---|---|---|---|---|
| 4,780,897 A | * | 10/1988 | McDaniel | A61B 6/4035 |
| | | | | 250/385.1 |
| 6,111,604 A | * | 8/2000 | Hashimoto | H04N 1/00204 |
| | | | | 348/220.1 |
| 8,009,213 B2 | | 8/2011 | Okita et al. | |
| 8,158,920 B2 | | 4/2012 | Suzuki et al. | |
| 8,159,573 B2 | | 4/2012 | Suzuki et al. | |
| 8,278,613 B2 | | 10/2012 | Okita et al. | |
| 8,427,567 B2 | | 4/2013 | Okita et al. | |
| 8,508,639 B2 | | 8/2013 | Mabuchi et al. | |

(Continued)

FOREIGN PATENT DOCUMENTS

| | | | |
|---|---|---|---|
| EP | 2234387 A1 | 9/2010 | |
| EP | 2549763 A2 | 1/2013 | |

(Continued)

OTHER PUBLICATIONS

Search Report dated Apr. 18, 2017, in European Patent Application No. 16197490.2.

*Primary Examiner* — Yogesh K Aggarwal
(74) *Attorney, Agent, or Firm* — Venable LLP

(57) ABSTRACT

An image sensor provided with an imaging unit including a plurality of photoelectric converters, the image sensor comprises: an input unit to which image data is input from outside of the image sensor; an image processor that applies image processing to image data obtained from the imaging unit and to the image data input from the input unit; and an output unit for outputting, to the outside, image data obtained through the image processing by the image processor.

31 Claims, 14 Drawing Sheets

(56) References Cited

U.S. PATENT DOCUMENTS

| | | |
|---|---|---|
| 8,648,951 B2 | 2/2014 | Mabuchi et al. |
| 8,988,575 B2 | 3/2015 | Mabuchi et al. |
| 2003/0219071 A1 | 11/2003 | Chang et al. |
| 2007/0177025 A1 | 8/2007 | Kopet et al. |
| 2008/0012952 A1 | 1/2008 | Lee |
| 2009/0174811 A1 | 7/2009 | Sung et al. |
| 2010/0053212 A1 | 3/2010 | Kang et al. |
| 2012/0147209 A1 | 6/2012 | Hiraoka et al. |
| 2012/0274808 A1* | 11/2012 | Chong ............... H04N 5/23293 348/234 |
| 2013/0308870 A1 | 11/2013 | Shan et al. |
| 2014/0015996 A1 | 1/2014 | Chawla et al. |
| 2014/0152871 A1 | 6/2014 | Campbell et al. |
| 2015/0155325 A1 | 6/2015 | Mabuchi et al. |
| 2015/0281539 A1* | 10/2015 | Ueki ...................... H04N 5/232 348/298 |
| 2015/0312476 A1 | 10/2015 | Wakabayashi |
| 2015/0319390 A1 | 11/2015 | Sanchez et al. |
| 2015/0362372 A1* | 12/2015 | Venkatesha ........... G01J 5/0044 250/208.1 |
| 2016/0150128 A1* | 5/2016 | Shaffer ................ H04N 3/1543 348/295 |
| 2016/0293646 A1 | 10/2016 | Miyamoto et al. |
| 2016/0323518 A1* | 11/2016 | Rivard ................... H04N 5/247 |

FOREIGN PATENT DOCUMENTS

| | | |
|---|---|---|
| JP | 2006-049361 A | 2/2006 |
| JP | 2015-041971 A | 3/2015 |
| KR | 10-2011-0075129 A | 7/2011 |

* cited by examiner

IMAGE SENSOR AND IMAGE CAPTURING APPARATUS

BACKGROUND OF THE INVENTION

Field of the Invention

The present invention relates to an image sensor and an image capturing apparatus.

Description of the Related Art

In recent years, the multi-functional ability of image sensors used in image capturing apparatuses, such as digital still cameras and digital video cameras, is advancing. As means to achieve the multi-functional ability of image sensors, image sensors are suggested that include an imaging unit composed of a pixel unit having photoelectric converters that convert light into electricity, and an image processor for applying image processing to image pickup signals output from the imaging unit.

Japanese Patent Laid-Open No. 2006-49361 discloses a technique related to an image sensor made by stacking an image sensor chip on a signal processor chip.

The signal processor chip of the image sensor described in Japanese Patent Laid-Open No. 2006-49361 is provided to apply signal processing to the output from the image sensor chip included in the same semiconductor module. Therefore, in order to reapply various types of image processing to image data output from the image sensor, a separate image processor chip needs to be provided outside the image sensor, that is to say, an extra constituent is needed.

SUMMARY OF THE INVENTION

The present invention has been made in consideration of the above problem, and enables execution of image processing inside an image sensor through input of image data from the outside of the image sensor.

According to the present invention, provided is an image sensor provided with an imaging unit including a plurality of photoelectric converters, the image sensor comprising: an input unit to which image data is input from outside of the image sensor; an image processor that applies image processing to image data obtained from the imaging unit and to the image data input from the input unit; and an output unit for outputting, to the outside, image data obtained through the image processing by the image processor.

Further, according to the present invention, provided is an image capturing apparatus, comprising: the image sensor provided with an imaging unit including a plurality of photoelectric converters; wherein the image sensor includes: an input unit to which image data is input from outside of the image sensor; an image processor that applies image processing to image data obtained from the imaging unit and to the image data input from the input unit; and an output unit for outputting, to the outside, image data obtained through the image processing by the image processor, a display processor for image data output from the image sensor; and a recording processor.

Furthermore, according to the present invention, provided is an image capturing apparatus, comprising: a first image sensor provided with an imaging unit including a plurality of photoelectric converters; and a second image sensor provided with an imaging unit including a plurality of photoelectric converters; wherein the first image sensor includes an input unit to which image data is input from outside, an image processor that applies image processing to the image data input from the input unit, and an output unit for outputting, to the outside, image data obtained through the image processing by the image processor, and the image processor applies the image processing to image data input from the second image sensor to the input unit of the first image sensor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

First, an image sensor according to a first embodiment of the present invention will be described. The image sensor according to the first embodiment has a function of receiving image signals input from the outside of the image sensor, and applying image processing to the input image signals inside the image sensor.

Figure 1:
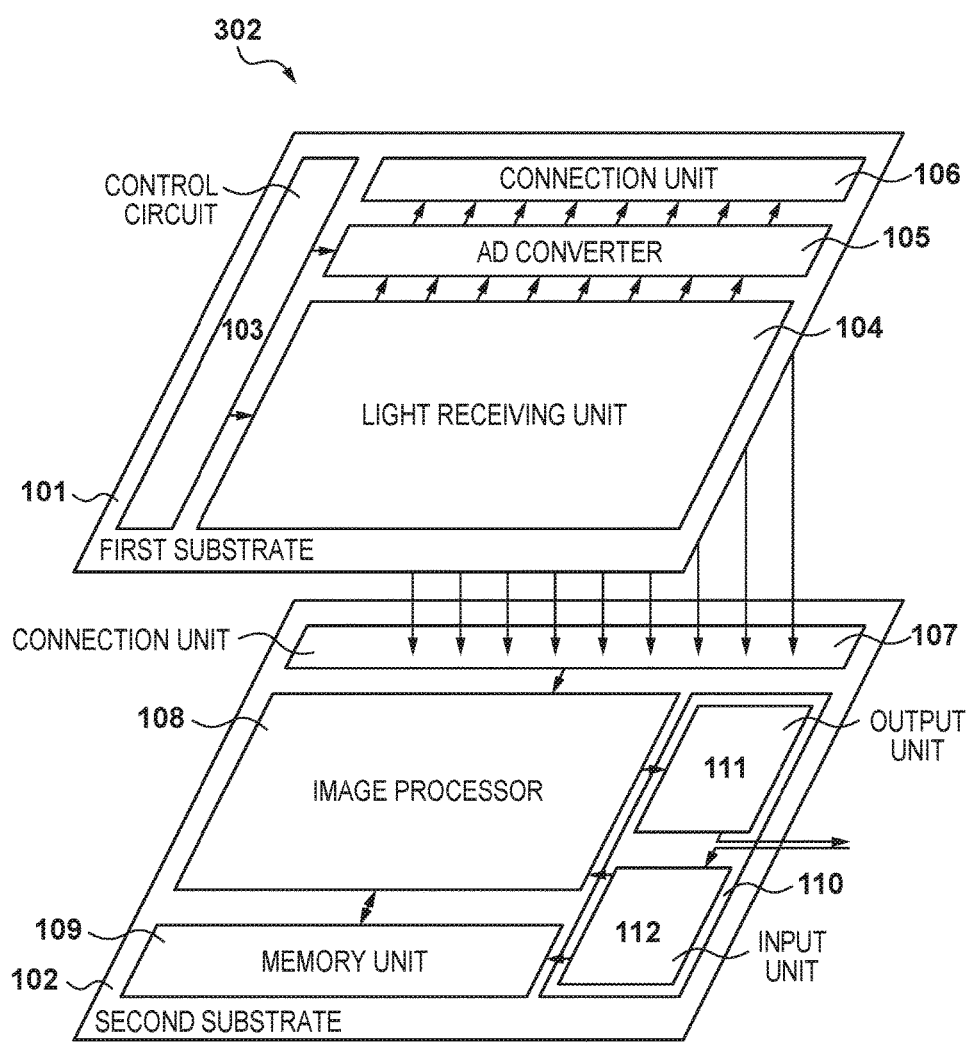
FIG. 1 is a block diagram showing a configuration of an image sensor according to a first embodiment of the present invention.

Below, a configuration of the image sensor according to the first embodiment will be described in detail using FIGS. 1 and 2. FIG. 1 is a block diagram showing the configuration of the image sensor according to the first embodiment of the present invention.

In FIG. 1, an image sensor 302 is structured in such a manner that a first substrate 101 (an imaging unit) and a second substrate 102 (a processing unit) are stacked together. The first substrate 101 and the second substrate 102 are connected by microbumps, vias, and the like between a connection unit 106 included in the first substrate 101 and a connection unit 107 included in the second substrate 102, and electrical connection is established therebetween. Although not illustrated, a control circuit 103 included in the first substrate 101 and an image processor 108 included in the second substrate 102 are also electrically connected in such a manner that they can communicate with each other.

The first substrate 101 has a light receiving unit 104, an analog/digital (AD) converter 105, the connection unit 106, and the control circuit 103. In the light receiving unit 104, a plurality of pixels including photoelectric converters that convert light into electricity are arrayed two-dimensionally in row and column directions. The AD converter 105 converts analog image signals generated by the pixels of the light receiving unit 104 into digital signals, and the connection unit 106 transfers the digital image signals (image data) output from the AD converter 105 to the second substrate 102. The control circuit 103 controls various types of driving in the light receiving unit 104 and the AD converter 105.

The second substrate 102 has the connection unit 107, the image processor 108, a memory unit 109, and an interface unit 110 that includes an output unit 111 and an input unit 112. The connection unit 107 receives the image signals transferred from the first substrate 101. The image processor 108 applies various types of image processing, such as signal amplification, reference level adjustment, defective pixel correction processing and developing processing, to digital image signals (image data) transferred from the first substrate 101, the memory unit 109, and the input unit 112. In addition to this function of applying various types of image processing, the image processor 108 also has a function of generating various composite images, such as a difference image, a sum image, and an average image, using digital image signals (image data) obtained through image shooting and digital image signals (image data) transferred from the input unit 112, and a function of generating a video by combining a plurality of pieces of image data. The image processor 108 also has a function of calculating, for example, luminance values of a subject on the basis of image data transferred from the input unit 112. A configuration of the image processor 108 will be described later in detail using FIG. 2.

The memory unit 109 temporarily stores image data from the image processor 108 and the input unit 112. The input unit 112 receives image data input from the outside of the image sensor 302 and transfers the image data to the image processor 108 and the memory unit 109, whereas the output unit 111 outputs image data output from the image processor 108 to the outside of the image sensor 302. In the first embodiment, it will be assumed that a common terminal is used for outputting image data from the interface unit 110 to the outside of the image sensor 302, and for inputting image data from the outside of the image sensor 302 to the interface unit 110. Inside the interface unit 110, the terminal of the interface unit 110 is connected to the input unit 112 when image data is input, and the terminal of the interface unit 110 is connected to the output unit 111 when image data is output. In the image sensor 302, the first substrate 101 (the imaging unit) and the second substrate 102 (the processing unit), including their constituents, compose one package.

Figure 2:
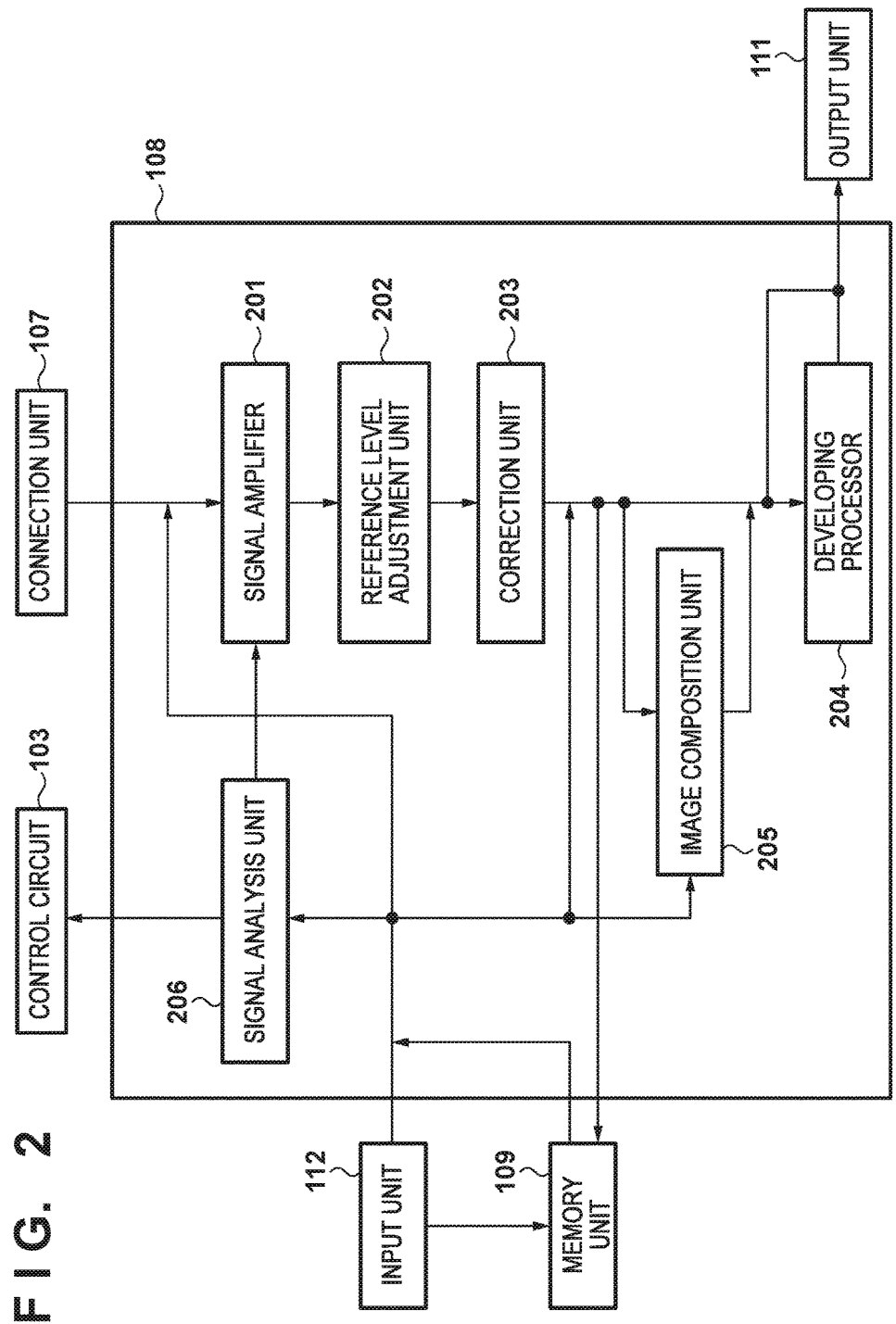
FIG. 2 is a block diagram showing a configuration of an image processor of the image sensor according to the first embodiment.

FIG. 2 is a block diagram showing the configuration of the image processor 108 of the image sensor 302 according to the first embodiment. In FIG. 2, a signal amplifier 201 amplifies input digital image signals (image data) with a predetermined gain. A reference level adjustment unit 202 makes an adjustment so that the signal levels of digital image signals (image data) in a dark state, in which no light is incident on the light receiving unit 104, have predetermined values. A correction unit 203 applies various types of correction processing, such as defective pixel correction processing and dark shading correction processing, to image data.

A developing processor 204 applies white balance adjustment and the like to image data, and then applies developing processing to the image data. An image composition unit 205 generates various composite images, such as a difference image, a sum image, and an average image, with use of image data that has been obtained through image shooting performed by the light receiving unit 104 and read out from the AD converter 105, and image data transferred from the input unit 112 and the memory unit 109.

A signal analysis unit 206 analyzes image data transferred from the input unit 112 and the memory unit 109, and on the basis of the result of analysis, sets a signal amplification factor used by the signal amplifier 201 and sets various types of driving in the light receiving unit 104 and the AD converter 105 via the control circuit 103.

Figure 3:
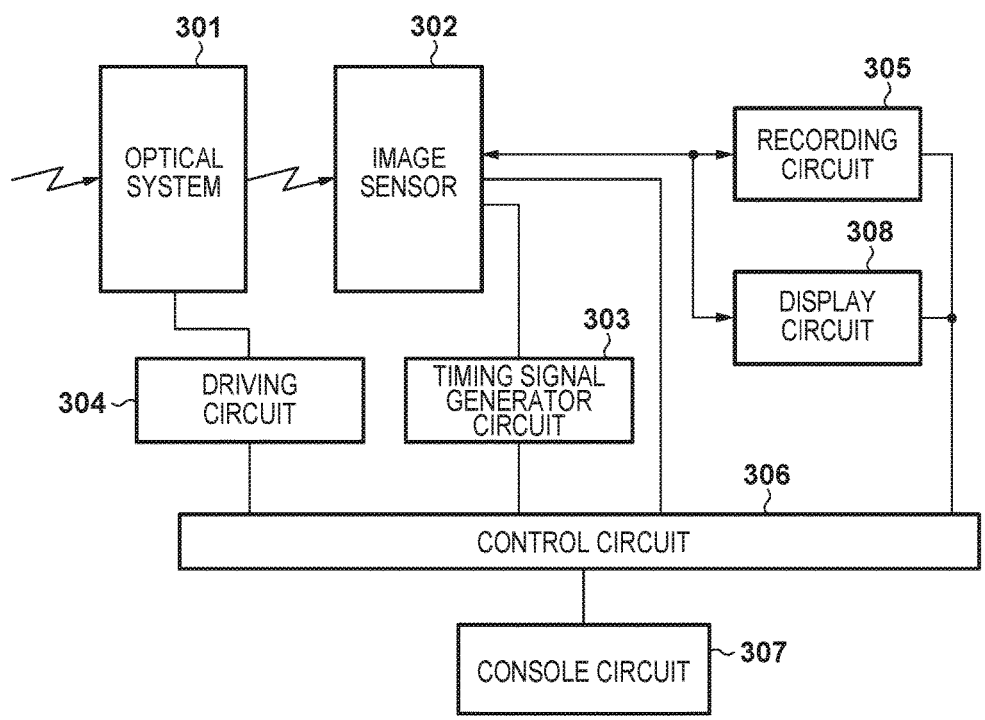
FIG. 3 is a block diagram showing a schematic configuration of an image capturing apparatus according to the first embodiment.

FIG. 3 is a block diagram showing a schematic configuration of an image capturing apparatus including the image sensor 302 configured in the above-described manner. In FIG. 3, an optical system 301, which comprises lenses, a diaphragm, and the like, is driven by a driving circuit 304, and the image sensor 302 converts light incident via the optical system 301 into electrical signals. A timing signal generator circuit 303 generates signals for causing the image sensor 302 to operate. In the present embodiment, the signals generated by the timing signal generator circuit 303 include vertical and horizontal synchronization signals, setting signals for setting various setting parameters within the image sensor 302, and so on.

As has been described using FIG. 1, the image sensor 302 has a function of generating image signals by applying various types of image processing, such as signal amplification, reference level adjustment, defective pixel correction processing, dark shading correction processing and developing processing, to electrical signals obtained by converting incident light. The image sensor 302 also has a function of receiving image data input from a recording circuit 305 and applying various types of image processing thereto. The recording circuit 305 is a nonvolatile memory, a memory card, or a similar recording medium that records and holds, for example, image data output from the image sensor 302 and image data input to the image sensor 302.

A control circuit 306 performs overall driving and control of the entire image capturing apparatus including the image sensor 302, the timing signal generator circuit 303, and the driving circuit 304. A console circuit 307 accepts signals from console members provided to the image capturing apparatus, and causes the control circuit 306 to reflect commands from a user. A display circuit 308 displays, for example, shot images, live-view images, and various setting screens.

The present embodiment has introduced an exemplary configuration in which the timing signal generator circuit 303 and the control circuit 306 of the image capturing apparatus are provided independently of the image sensor 302. However, the present embodiment is not limited to this configuration, and the function(s) of at least a part of the timing signal generator circuit 303 and the control circuit 306 may be built in the image sensor 302.

Figure 4:
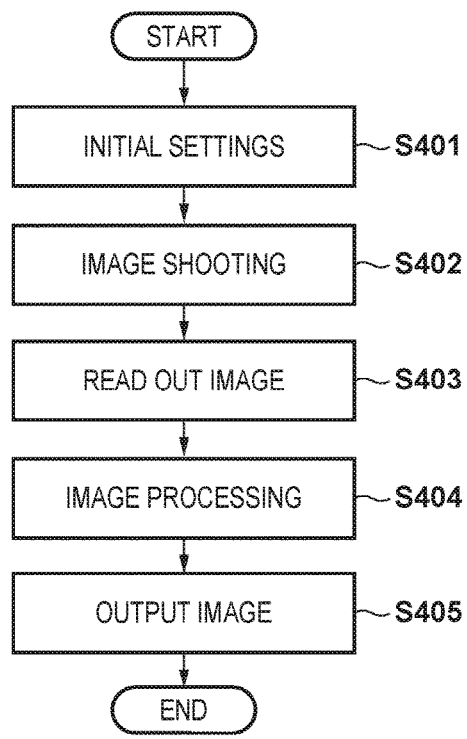
FIG. 4 is a flowchart of processing executed at the time of normal image shooting according to the first embodiment.
Figure 6:
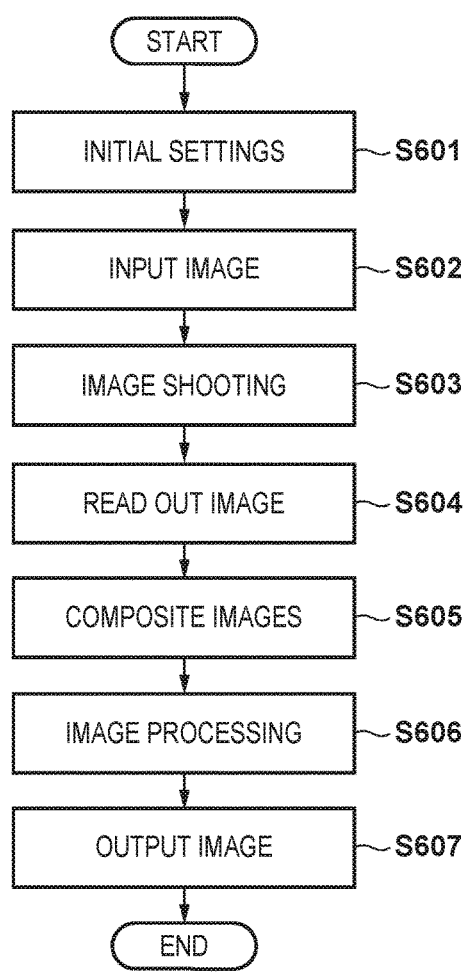
FIG. 6 is a flowchart of image composition processing for a shot image and an input image according to the first embodiment.
Figure 5:
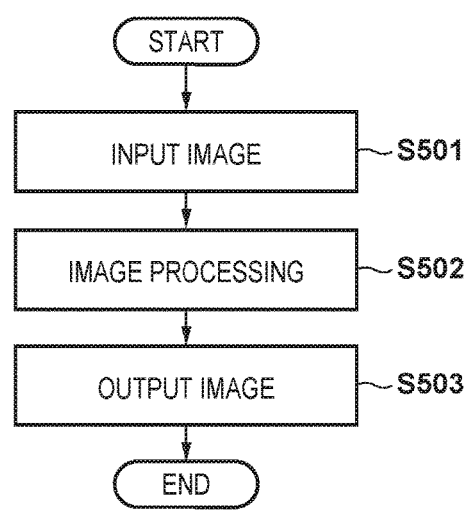
FIG. 5 is a flowchart of processing executed at the time of image input in the first embodiment.

Using FIGS. 4 to 6, the following provides a detailed description of various types of image shooting processing and image generation processing that are executed by the image capturing apparatus including the image sensor 302 in the first embodiment.

FIG. 4 is a flowchart of processing executed at the time of normal image shooting in the first embodiment. In FIG. 4, first, initial settings of image shooting conditions, such as a film speed, an f-number and an exposure period, are configured in accordance with, for example, an instruction issued by the user via the console circuit 307 (step S401). Next, the optical system 301 and the like are controlled to expose the light receiving unit 104 of the image sensor 302 to light (step S402). After a predetermined accumulation period has elapsed, the AD converter 105 converts electrical signals generated by the light receiving unit 104 into digital image signals (image data), which are then read into the image processor 108 (step S403).

Next, the signal amplifier 201, the reference level adjustment unit 202, the correction unit 203 and the developing processor 204 apply various types of image processing, such as signal amplification, reference level adjustment, defective pixel correction processing, white balance adjustment and developing processing, to the image data input to the image processor 108 (step S404). Finally, the image data output from the image processor 108 is output from the output unit 111 to the recording circuit 305 or the display circuit 308 outside the image sensor 302 (step S405), and then the present image shooting processing is ended.

FIG. 5 is a flowchart of processing executed at the time of image input in the first embodiment. The processing executed at the time of image input, which will be described using FIG. 5, can be used when, for example, RAW image data that was obtained through image shooting performed by the image capturing apparatus in the past and has been stored outside is redeveloped using the image sensor 302 included in the image capturing apparatus on the basis of desired developing parameters.

After image data input from the outside of the image sensor 302 undergoes various types of image processing in the image processor 108 and is output from the output unit 111, the image data is used in recording to a nonvolatile memory, a memory card, or a similar recording medium serving as the recording circuit 305, or in image display performed by the display circuit 308. The image data may also be used in various types of study and analysis. For example, the image data may be used in person recognition and facial recognition in the field of surveillance cameras. Furthermore, the image data may be used in, for example, detection of pedestrians, recognition of objects including signs, white lines, on-road obstacles, and bicycles, and recognition of characters in the field of vehicle-mounted cameras for autonomous driving of automobiles and the like. Note that signal processing need not be applied to the entire region of an input image, and may be applied to a limited region of the input image on the basis of the result of subject recognition and the like. Furthermore, the input unit 112 and the like may cut out only necessary regions.

In FIG. 5, first, RAW image data stored in the recording circuit 305 is input to the image sensor 302 via the input unit 112 (step S501). Next, the developing processor 204 of the image processor 108 applies various types of image processing, such as white balance adjustment and developing processing, to the image data input to the image sensor 302 in accordance with, for example, an instruction issued by the user via the console circuit 307 (step S502). It will be assumed that the input image data to which the image processing is applied underwent signal amplification, reference level adjustment, defective pixel correction processing, dark shading correction processing, and the like in the signal amplifier 201, the reference level adjustment unit 202, and the correction unit 203 of the image processor 108 at the time of image shooting. Once the image data has been output from the image sensor 302 after such image processing and stored to the recording circuit 305, such image processing can be omitted when the image data is input to the image sensor 302 again.

Finally, the image data that has been output from the image processor 108 after various types of image processing have been applied thereto is output from the output unit 111 to the recording circuit 305 or the display circuit 308 outside the image sensor 302 (step S503), and then the present processing is ended.

It is preferable that the timing of processing described using the flowchart of FIG. 4, that is to say, image shooting processing and image processing that is applied by the image processor 108 to shot image data, be different from the timing of processing described using the flowchart of FIG. 5, that is to say, image processing applied by the image processor 108 to input image data. By thus causing the image processor 108 to disperse the image processing for the shot image data and the image processing for the input image data instead of simultaneously executing them, the processing load of the image processor 108 can be reduced, and the maximum power consumption can be suppressed.

FIG. 6 is a flowchart of image composition processing for a shot image and an input image in the first embodiment. The image composition processing for a shot image and an input image, which will be described using FIG. 6, can be used in, for example, compositing an image that was shot in the past and has been stored outside the image sensor 302 with an image that has been newly shot by the image sensor 302.

In FIG. 6, first, initial settings of image shooting conditions, such as a film speed, an f-number and an exposure period, are configured in accordance with, for example, an instruction issued by the user via the console circuit 307 (step S601). Next, image data stored in the recording circuit 305 is input to the image sensor 302 via the input unit 112, and then stored to the memory unit 109 (step S602). As the input image data will undergo composition processing together with shot image data that will thereafter be shot and read into the image processor 108, the input image data needs to be in the same state as the shot image data.

Specifically, as the pre-composition shot image data read into the image processor 108 is RAW image data to which compression processing and the like have not been applied, the input image data needs to be in the same state. Furthermore, the shot image data and the input image data are composited together after the signal amplifier 201, the reference level adjustment unit 202, and the correction unit 203 of the image processor 108 have applied signal amplification, reference level adjustment, defective pixel correction processing, dark shading correction processing, and the like to the shot image data. Therefore, it is preferable that the input image data has been output and stored after similar processing was applied thereto at the time of image shooting.

Thereafter, the optical system 301 and the like are controlled to expose the light receiving unit 104 of the image sensor 302 to light (step S603). After a predetermined accumulation period has elapsed, the AD converter 105 converts electrical signals generated by the light receiving unit 104 into digital image signals, which are then read into the image processor 108 as the shot image data (step S604).

Next, the image composition unit 205 of the image processor 108 composites together the shot image data and the input image data that has been stored in the memory unit 109 (step S605). At this time, for example, processing for amplifying the input image data with an appropriate gain is simultaneously executed so as to bring the image shooting conditions of the input image data, such as an accumulation period and a film speed setting, into conformity with those of the shot image data.

Then, the developing processor 204 of the image processor 108 applies various types of image processing, such as white balance adjustment and developing processing, to the composite image data (step S606). Finally, the image data output from the image processor 108 is output from the output unit 111 to the recording circuit 305 or the display circuit 308 outside the image sensor 302 (step S607), and then the present processing is ended.

As described above, according to the first embodiment, the image sensor includes the input unit for receiving input image data, and the image processor included in the image sensor can apply various types of image processing to the input image data. In this way, redevelopment of an image that has been output from the image sensor, as well as processing that uses a plurality of images, such as composition of a newly-shot image with an image that was shot in the past and has been stored, can be performed without using an external image processing circuit.

Although the image capturing apparatus according to the first embodiment has been described thus far using FIGS. 1 to 6, the present invention is not limited in this way, and may be embodied in various manners.

For example, in the processing executed at the time of image input, which has been described using FIGS. 5 and 6, an image shot by the present image capturing apparatus is used as input image data. However, the present invention is not limited in this way, and an image that has been shot and output by another image capturing apparatus can be input.

In the image composition processing for a shot image and an input image, which has been described using FIG. 6, a simple composite image is generated from shot image data and input image data as one example of image composition processing. However, the present invention is not limited in this way, and may execute, for example, processing for generating a composite image after amplifying each of the shot image data and the input image data with a predetermined gain, as in high-dynamic-range composition processing (HDR composition processing).

Note that the differences between the image shooting conditions of an input image and the image shooting conditions of a shot image are not limited to being adjusted by executing, for example, processing for amplifying input image data with an appropriate gain; for example, a plurality of types of input image data with different image shooting conditions may be input and stored to the memory unit 109, and each time image shooting is performed, appropriate input image data may be selected and used in accordance with the image shooting conditions used in the image shooting. Furthermore, in order to reduce random noise, processing for generating average image data with respect to shot image data and input image data may be executed.

For example, in the image composition processing for a shot image and an input image, a difference image indicating a difference between shot image data and input image data may be generated. When this method is applied to, for example, a vehicle-mounted camera, the difference between the two images may be obtained to detect on-road obstacles, bicycles, and pedestrians. This method can also be used when, for example, the image processor 108 of the image sensor 302 applies black subtraction processing to image data obtained through image shooting performed by the image sensor 302 using black image data that was obtained through image shooting in the past and has been stored outside the image sensor 302. For example, in the case of black subtraction processing for astronomical image shooting, a difference image can be generated by subtracting a black image serving as input image data from a shot astronomical image serving as shot image data.

Although image signals pertaining to one image of one type are input to generate a difference image in the foregoing description, no limitation is intended in this regard. For example, a plurality of pieces of black image data with different image shooting conditions may be input and stored to the memory unit 109, and each time image shooting is performed, appropriate black image data may be selected and used in accordance with the image shooting conditions used in the image shooting.

Second Embodiment

Figure 7:
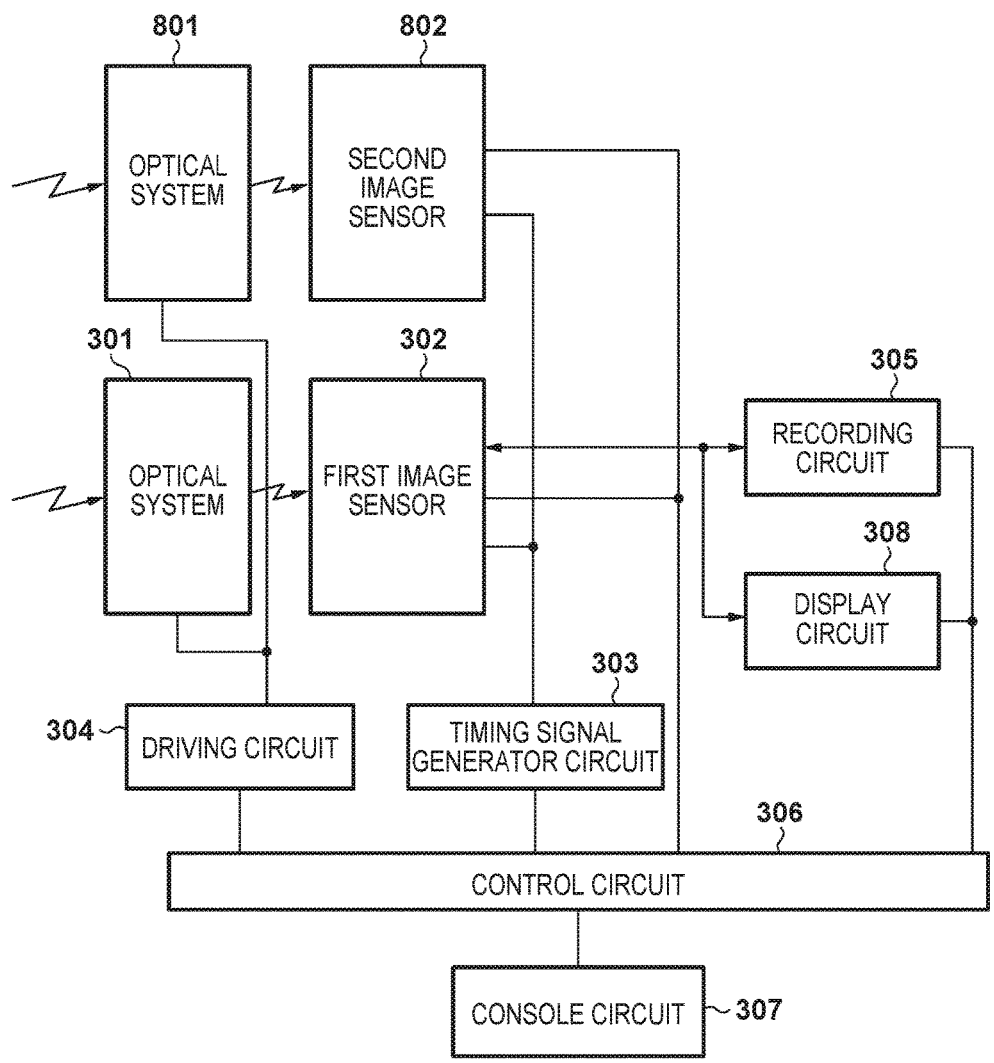
FIG. 7 is a block diagram showing a schematic configuration of an image capturing apparatus according to a second embodiment.

A second embodiment of the present invention will now be described. FIG. 7 is a block diagram showing a schematic configuration of an image capturing apparatus according to the second embodiment. As shown in FIG. 7, the image capturing apparatus according to the second embodiment is realized by adding an optical system 801 and a second image sensor 802 to the image capturing apparatus shown in FIG. 3. As other constituents are similar to the constituents shown in FIG. 3, a description thereof will be omitted; in the second embodiment, the image sensor 302 will be referred to as the first image sensor 302 for distinction from the second image sensor 802.

Figure 8:
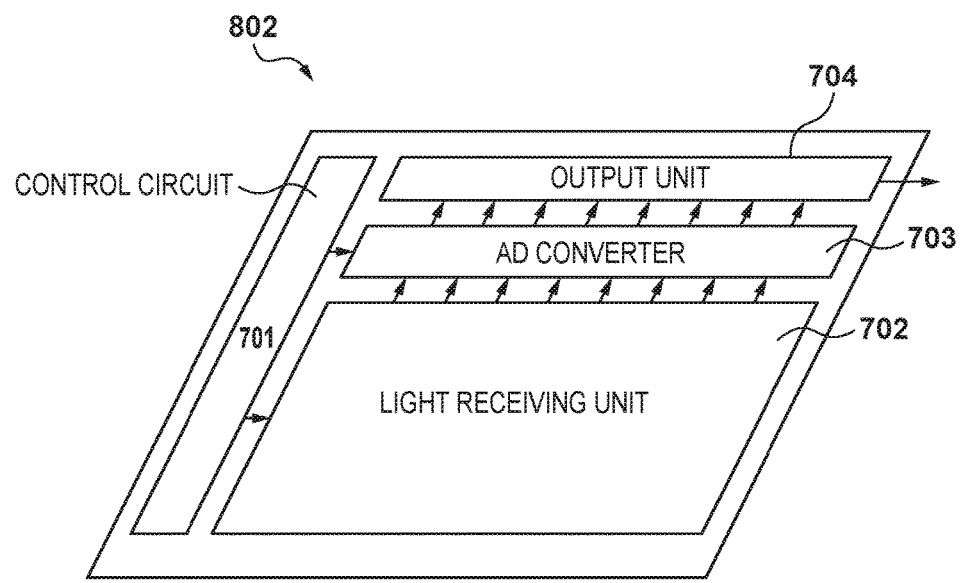
FIG. 8 is a block diagram showing a configuration of a second image sensor according to the second embodiment.

FIG. 8 is a block diagram showing a configuration of the second image sensor according to the second embodiment. In FIG. 8, the second image sensor 802 includes a light receiving unit 702, an analog/digital (AD) converter 703, an output unit 704, and a control circuit 701. In the light receiving unit 702, a plurality of pixels including photoelectric converters that convert light into electricity are arrayed two-dimensionally in row and column directions. The AD converter 703 converts analog image signals generated by the pixels of the light receiving unit 702 into digital signals (image data), and the output unit 704 outputs the digital image signals (image data) output from the AD converter 703 to the outside of the image sensor 802. The control circuit 701 controls various types of driving in the light receiving unit 702 and the AD converter 703.

Unlike the first image sensor 302 shown in FIG. 1, the second image sensor 802 does not include an image processor. Therefore, in the second embodiment, the second image sensor 802 converts light incident via the optical system 801, which comprises lenses, a diaphragm, and the like, into electrical signals, and outputs the electrical signals to the first image sensor 302. Then, the image processor 108 of the first image sensor 302 applies various types of image processing thereto.

In the second embodiment, the timing signal generator circuit 303 generates signals for causing the first image sensor 302 and the second image sensor 802 to operate, and the driving circuit 304 drives the optical systems 301 and 801. In the present embodiment, the signals generated by the timing signal generator circuit 303 include vertical and horizontal synchronization signals, setting signals for setting various setting parameters within the image sensors 302 and 802, and so on. The signals generated by the timing signal generator circuit 303 may also include, for example, address information for specifying a transmission destination thereof. By thus including the address information for specifying the transmission destination in the generated signals, signal lines can be used in common. In FIG. 7, the first image sensor 302 and the second image sensor 802 are connected in parallel to the timing signal generator circuit 303 and the control circuit 306. However, they are not limited to being connected in this way, and may be connected in series. In this case, signals and the like input from the timing signal generator circuit 303 are supplied to the second image sensor 802 by way of the first image sensor 302. This configuration can simplify a control-dedicated connection circuit when two or more image sensors are connected.

Using FIGS. 9 to 13, the following provides a detailed description of various types of image shooting processing and image generation processing that are executed by the image capturing apparatuses in the second embodiment. In the second embodiment, processing executed at the time of normal image shooting, which requires only the first image sensor 302, is the same as that according to the first embodiment described using FIG. 4, and thus a description thereof will be omitted.

Figure 9:
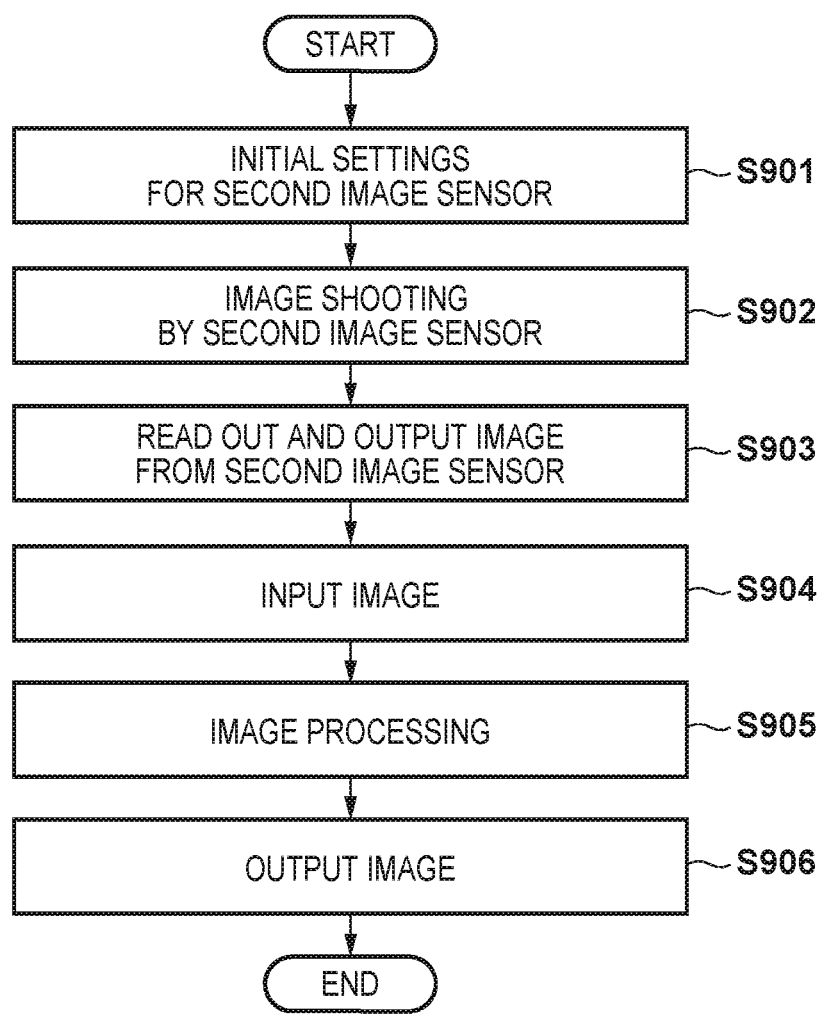
FIG. 9 is a flowchart of image shooting processing executed when the first image sensor applies image processing to an image shot by the second image sensor according to the second embodiment.

FIG. 9 is a flowchart of image shooting processing executed when image data output from the second image sensor 802 is input to the first image sensor 302, and the first image sensor 302 applies various types of image processing to the input image data thereinside and outputs the resultant image data.

In FIG. 9, first, initial settings of image shooting conditions, such as a film speed, an f-number and an exposure period, are configured with respect to the second image sensor 802 in accordance with, for example, an instruction issued by a user via the console circuit 307 (step S901). Next, the optical system 801 and the like are controlled to expose the light receiving unit 702 of the second image sensor 802 to light (step S902). After a predetermined accumulation period has elapsed, the AD converter 703 converts electrical signals generated by the light receiving unit 702 into digital image signals (image data), which are then output from the output unit 704 to the outside of the second image sensor 802 (step S903). Note that as the second image sensor 802 does not include an image processor, various types of image correction and the like have not been applied to the output image data.

The image data output from the second image sensor 802 is input to the first image sensor 302 (step S904). Next, the signal amplifier 201, the reference level adjustment unit 202, the correction unit 203 and the developing processor 204 of the image processor 108 apply various types of image processing, such as signal amplification, reference level adjustment, defective pixel correction processing, white balance adjustment and developing processing, to the image data input to the first image sensor 302 (step S905). Finally, the image data output from the image processor 108 is output from the output unit 111 to the recording circuit 305 or the display circuit 308 outside the first image sensor 302 (step S906), and then the image shooting processing is ended.

Figure 10:
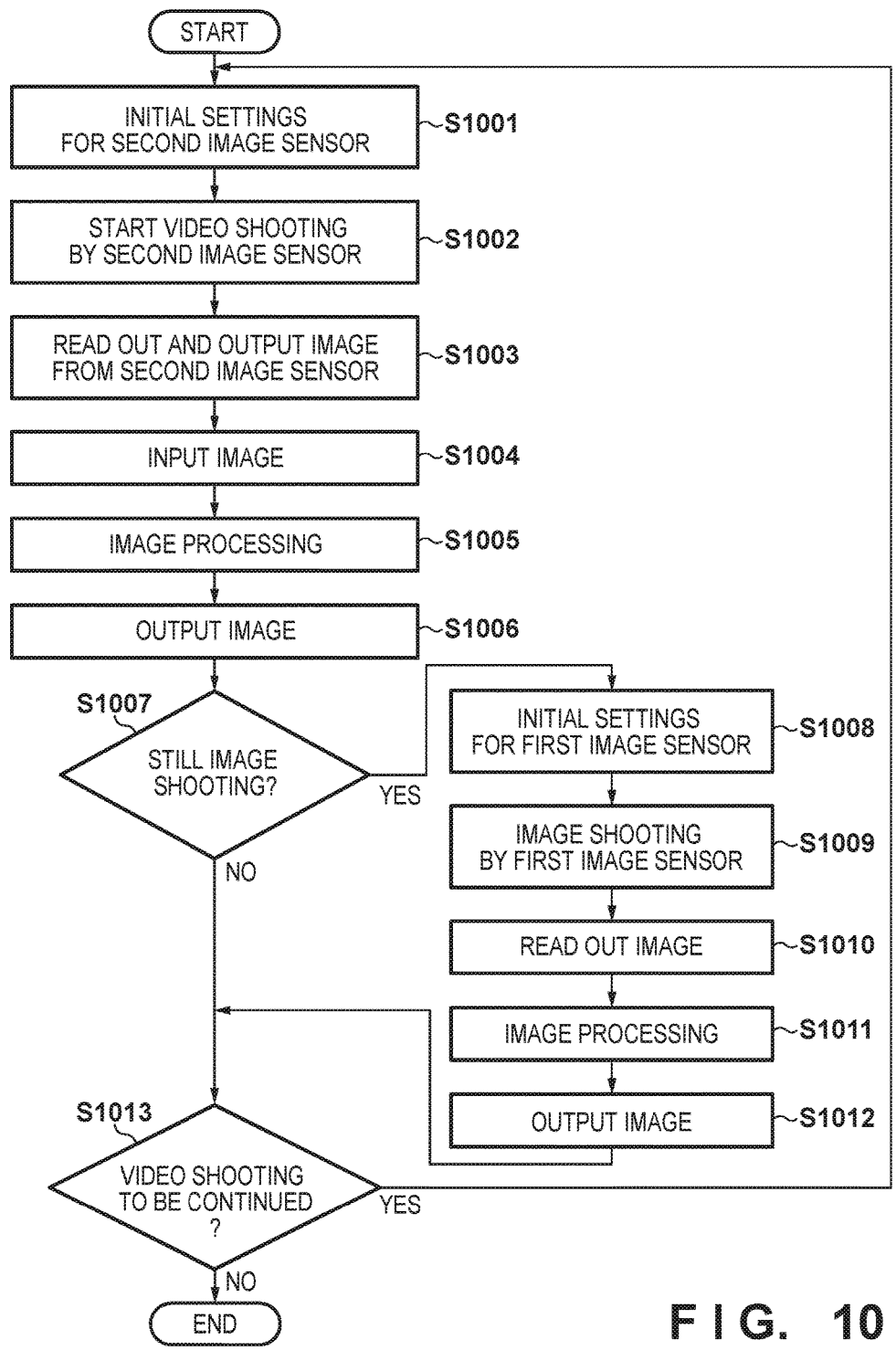
FIG. 10 is a flowchart of image shooting processing executed when the first image sensor shoots a video and the second image sensor shoots a still image according to the second embodiment.

FIG. 10 is a flowchart of image shooting processing executed when the first image sensor 302 shoots a still image and the second image sensor 802 shoots a video in the second embodiment. The following describes an exemplary case in which the first image sensor 302 shoots a still image while the second image sensor 802 is shooting live-view images or a video. Alternatively, the second image sensor 802 may shoot a still image while the first image sensor 302 is shooting live-view images or a video.

In FIG. 10, first, initial settings of image shooting conditions, such as a film speed, an f-number and an exposure period, are configured with respect to the second image sensor 802 in accordance with, for example, an instruction issued by the user via the console circuit 307 (step S1001). Next, the optical system 801 and the like are controlled to expose the light receiving unit 702 of the second image sensor 802 to light, and live-view image shooting or video shooting is started (step S1002).

The AD converter 703 converts per-frame electrical signals generated by the light receiving unit 702 into digital image signals (image data), which are then output from the output unit 704 to the outside of the second image sensor 802 (step S1003). Note that as the second image sensor 802 does not include an image processor, various types of image correction and the like have not been applied to the output image data.

The image data output from the second image sensor 802 is input to the first image sensor 302 (step S1004). Next, the signal amplifier 201, the reference level adjustment unit 202, the correction unit 203 and the developing processor 204 of the image processor 108 apply various types of image processing, such as signal amplification, reference level adjustment, defective pixel correction processing, white balance adjustment and developing processing, to the image data input to the first image sensor 302 (step S1005). Then, the image data output from the image processor 108 is output from the output unit 111 to the recording circuit 305 and the display circuit 308 outside the first image sensor 302 at the time of video shooting and live-view image shooting, respectively (step S1006).

If the user has issued an instruction for still image shooting via the console circuit 307 during live-view image shooting or video shooting (YES of step S1007), the first image sensor 302 starts the still image shooting.

First, initial settings of image shooting conditions, such as a film speed, an f-number and an exposure period, are configured with respect to the first image sensor 302 in accordance with, for example, an instruction issued by the user via the console circuit 307 (step S1008). Next, the optical system 301 and the like are controlled to expose the light receiving unit 104 of the first image sensor 302 to light (step S1009). After a predetermined accumulation period has elapsed, the AD converter 105 converts electrical signals generated by the light receiving unit 104 into digital image signals (image data), which are then read into the image processor 108 (step S1010).

Next, the signal amplifier 201, the reference level adjustment unit 202, the correction unit 203 and the developing processor 204 apply various types of image processing, such as signal amplification, reference level adjustment, defective pixel correction processing, white balance adjustment and developing processing, to the image signals input to the image processor 108 (step S1011). Then, the image signals output from the image processor 108 are output from the output unit 111 to the recording circuit 305 or the display circuit 308 outside the first image sensor 302 (step S1012).

After the still image shooting, or if the instruction for the still image shooting has not been issued (NO of step S1007), whether to subsequently continue the live-view image shooting or the video shooting is determined (step S1013). If the live-view image shooting or the video shooting is to be continued, a sequence of image shooting operations returns to step S1001 to perform the live-view image shooting or the video shooting for the next frame; if the live-view image shooting or the video shooting is not to be continued, the sequence of image shooting operations is ended.

Figure 11:
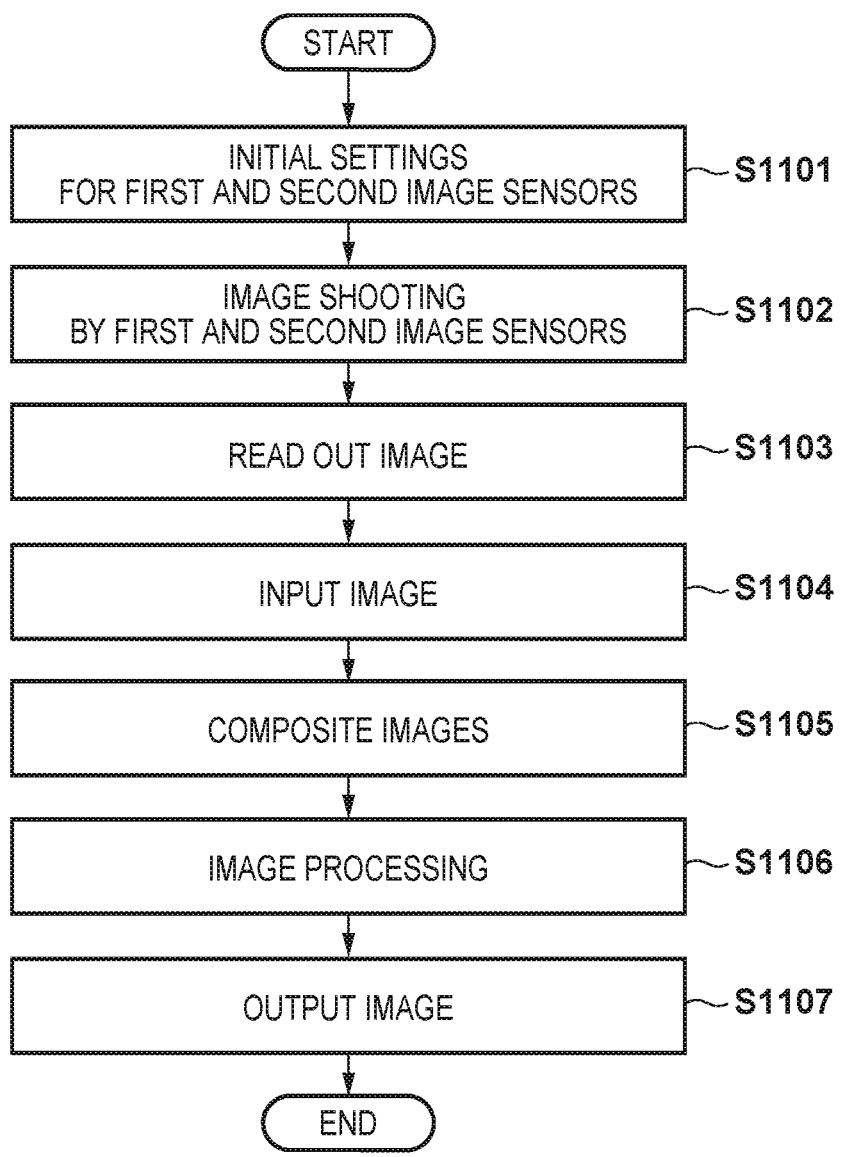
FIG. 11 is a flowchart of image shooting processing executed when the first and second image sensors shoot still images and the shot still images are composited together according to the second embodiment.

FIG. 11 is a flowchart of image shooting processing executed when still images shot by the first image sensor 302 and the second image sensor 802 are composited together in the second embodiment. This image shooting method can be used in, for example, generating a plurality of parallax images for 3D display using the two image sensors. When this method is applied to a vehicle-mounted camera and the like, a distance to a subject may be measured on the basis of parallax images obtained using the two image sensors. That is to say, a distance to a target object can be measured from parallax images obtained from the two image sensors using the principle of triangulation.

In FIG. 11, first, initial settings of image shooting conditions, such as a film speed, an f-number and an exposure period, are configured with respect to the first image sensor 302 and the second image sensor 802 in accordance with, for example, an instruction issued by the user via the console circuit 307 (step S1101). Next, the optical systems 301, 801 and the like are controlled to expose the light receiving unit 104 of the first image sensor 302 and the light receiving unit 702 of the second image sensor 802 to light (step S1102). After a predetermined accumulation period has elapsed, the AD converter 105 converts electrical signals generated by the light receiving unit 104 of the first image sensor 302 into digital image signals (image data), which are then read into the image processor 108 as shot image data (step S1103). Also, the AD converter 703 converts electrical signals generated by the light receiving unit 702 of the second image sensor 802 into digital image signals (image data), which are then output from the output unit 704 to the outside of the second image sensor 802 (step S1103), and input to the image sensor 302 (step S1104). Note that as the second image sensor 802 does not include an image processor, various types of image correction and the like have not been applied to the image data that is output from the second image sensor 802 and input to the image sensor 302.

Thereafter, the signal amplifier 201, the reference level adjustment unit 202, the correction unit 203 and the developing processor 204 of the image processor 108 apply various types of image processing, such as signal amplification, reference level adjustment and defective pixel correction processing, to each of the image data obtained through image shooting performed by the first image sensor 302 and the image data obtained through image shooting performed by the second image sensor 802. After various types of image processing have been applied, this image data pair is composited together by the image composition unit 205 of the image processor 108 (step S1105). Next, the developing processor 204 of the image processor 108 applies various types of image processing, such as white balance adjustment and developing processing, to the composite image data (step S1106).

Finally, the image data output from the image processor 108 is output from the output unit 111 to the recording circuit 305 or the display circuit 308 outside the image sensor 302 (step S1107), and then the image shooting processing is ended.

Figure 12:
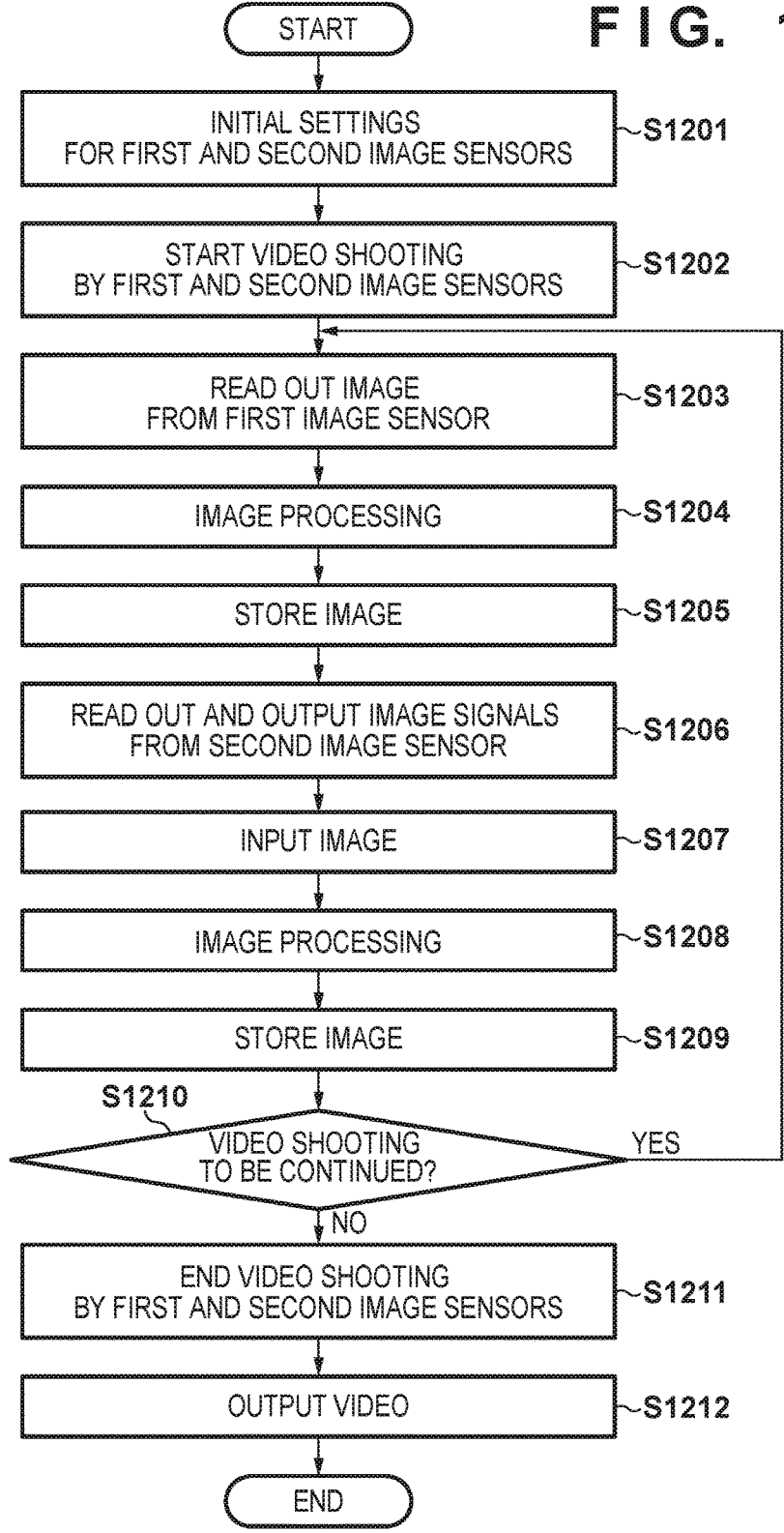
FIG. 12 is a flowchart of image shooting processing executed when the first and second image sensors shoot videos and the shot videos are composited together according to the second embodiment.

FIG. 12 is a flowchart of image shooting processing executed when videos of the same subject shot by the first image sensor 302 and the second image sensor 802 are composited together in the second embodiment. This image shooting method can be used in, for example, generating a video of a high frame rate by alternatingly reading out image data output from one image sensor and image data output from the other image sensor and compositing them together.

In FIG. 12, first, initial settings of image shooting conditions, such as a film speed, an f-number and an exposure period, are configured with respect to the first image sensor 302 and the second image sensor 802 in accordance with, for example, an instruction issued by the user via the console circuit 307 (step S1201). Next, the optical systems 301, 801 and the like are controlled to expose the light receiving unit 104 of the first image sensor 302 and the light receiving unit 702 of the second image sensor 802 to light, and video shooting is started (step S1202). Note that the first image sensor 302 and the second image sensor 802 perform video shooting with the same frame rate and a phase shift corresponding to half of a period.

When the light receiving unit 104 of the first image sensor 302 has completed the accumulation corresponding to one frame, the AD converter 105 converts electrical signals generated by the light receiving unit 104 into digital image signals (image data), which are then read into the image processor 108 as shot image data (step S1203). Next, the signal amplifier 201, the reference level adjustment unit 202, the correction unit 203 and the developing processor 204 of the image processor 108 apply various types of image processing, such as signal amplification, reference level adjustment, defective pixel correction processing, white balance adjustment and developing processing, to the image data read into the image processor 108 (step S1204). The image data to which signal processing has been applied is stored to the memory unit 109 (step S1205).

Next, when the light receiving unit 702 of the second image sensor 802 has completed the accumulation corresponding to one frame, the AD converter 703 converts electrical signals generated by the light receiving unit 702 into digital image signals, which are then output from the output unit 704 to the outside of the second image sensor 802 (step S1206). Note that as the second image sensor 802 does not include an image processor, various types of image correction and the like have not been applied to the output image data.

The image data output from the second image sensor 802 is input to the first image sensor 302 (step S1207). Next, the signal amplifier 201, the reference level adjustment unit 202, the correction unit 203 and the developing processor 204 of the image processor 108 apply various types of image processing, such as signal amplification, reference level adjustment, defective pixel correction processing, interframe noise reduction processing, white balance adjustment and developing processing, to the image data input from the second image sensor 802 through the input unit 112 (step S1208). The image data to which signal processing has been applied is stored to the memory unit 109, following the image data of the first image sensor 302 that has been stored earlier (step S1209).

Thereafter, whether to subsequently continue video shooting is determined (step S1210). If video shooting is to be continued, a sequence of image shooting operations returns to step S1203, and the foregoing processing is repeated. If video shooting is not to be continued, the light receiving unit 104 of the first image sensor 302 and the light receiving unit 702 of the second image sensor 802 are blocked from exposure to light, and video shooting is ended (step S1211). Then, video data stored in the memory unit 109 is output from the output unit 111 to the recording circuit 305 outside the first image sensor 302 (step S1212), and the sequence of image shooting operations is ended.

Figure 13:
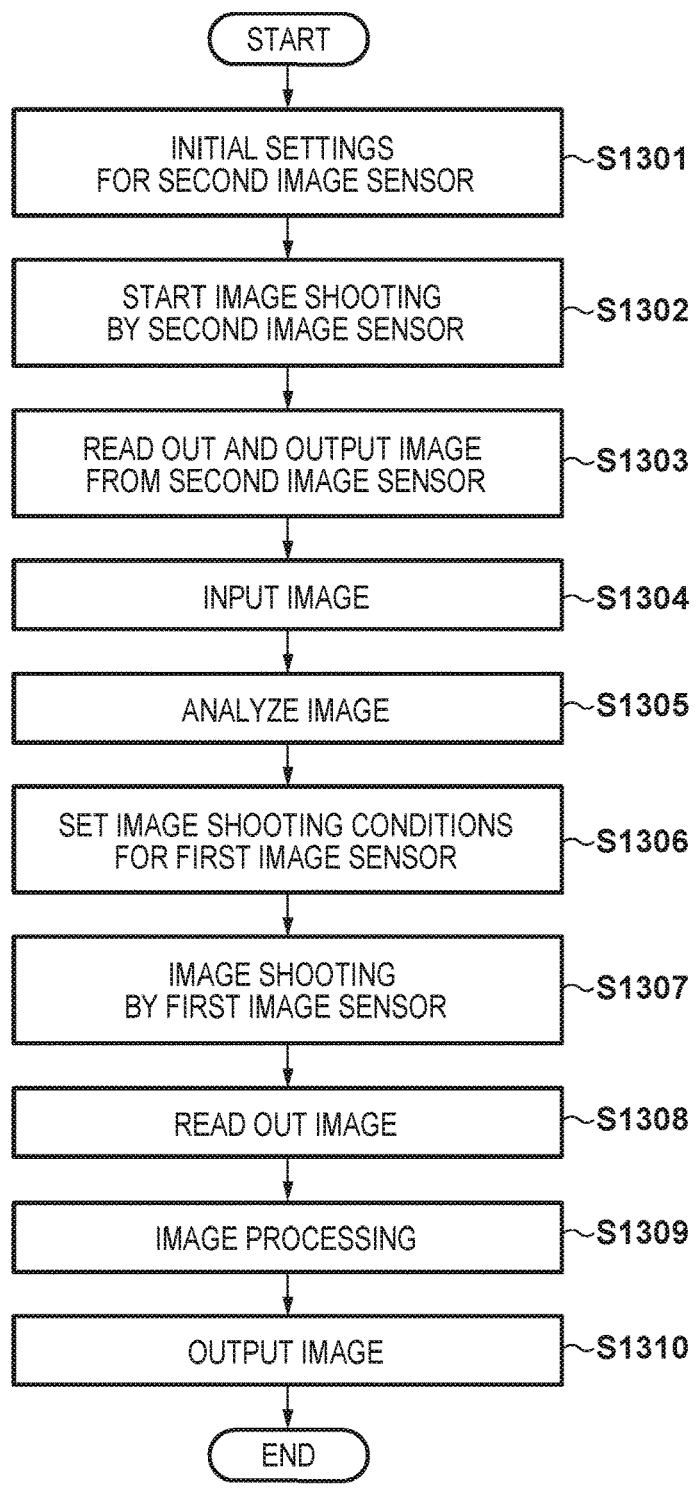
FIG. 13 is a flowchart of image shooting processing executed when the second image sensor is used as auxiliary means in image shooting performed by the first image sensor according to the second embodiment.

FIG. 13 is a flowchart of image shooting processing executed when the second image sensor 802 is used as auxiliary means for determining image shooting conditions for image shooting performed by the first image sensor 302 in the second embodiment. This processing can be used when, for example, the image processor 108 included in the first image sensor 302 calculates photometric values of a subject on the basis of output signals from the second image sensor 802, and image shooting conditions for image shooting performed by the first image sensor 302 are determined on the basis of the calculated photometric values.

In FIG. 13, first, initial settings of measurement conditions, such as a film speed and an exposure period, are configured with respect to the second image sensor 802 (step S1301). Next, the optical system 801 and the like are controlled to expose the light receiving unit 702 of the second image sensor 802 to light, and image shooting is started (step S1302). The AD converter 703 converts per-frame electrical signals generated by the light receiving unit 702 into digital image signals (image data), which are then output from the output unit 704 to the outside of the second image sensor 802 (step S1303). Note that as the second image sensor 802 does not include an image processor, various types of image correction and the like have not been applied to the output image data.

The image data output from the second image sensor 802 is input to the first image sensor 302 (step S1304). Then, the signal analysis unit 206 of the image processor 108 analyzes the image data from the second image sensor 802 to calculate, for example, luminance values of a subject (step S1305). Then, image shooting conditions, such as a film speed, an f-number and an exposure period, for image shooting performed by the first image sensor 302 are set on the basis of the calculation result (step S1306). Next, the optical system 301 and the like are controlled to expose the light receiving unit 104 of the first image sensor 302 to light (step S1307). After a predetermined accumulation period has elapsed, the AD converter 105 converts electrical signals generated by the light receiving unit 104 into digital image signals (image data), which are then read into the image processor 108 (step S1308).

Next, the signal amplifier 201, the reference level adjustment unit 202, the correction unit 203 and the developing processor 204 apply various types of image processing, such as signal amplification, reference level adjustment, defective pixel correction processing, white balance adjustment and developing processing, to the image data input to the image processor 108 (step S1309). Finally, the image data output from the image processor 108 is output from the output unit 111 to the recording circuit 305 or the display circuit 308 outside the first image sensor 302 (step S1310), and then the image shooting processing is ended.

As described above, according to the second embodiment, another image sensor is provided in addition to the image sensor described in the first embodiment, and thus image processing can be applied to image data generated through image shooting performed by the other image sensor using an image processing circuit included in the image sensor. That is to say, image processing can be applied to image data from the two image sensors without using an external image processing circuit.

Furthermore, providing the image processing circuit inside the image sensor offers advantages that cannot be achieved when one image processing circuit provided outside the image sensor needs to receive, as input, image data from a plurality of image sensors. These advantages concern speed-up, as well as the number of terminals necessary for the circuit, in outputting the result of compositing image data from a plurality of image sensors.

The foregoing present embodiment has introduced an exemplary configuration in which the first image sensor 302 includes an image processor but the second image sensor 802 does not include an image processor. However, the present embodiment is not limited to this configuration; for example, the second image sensor 802 may also include an image processor and an input unit similarly to the first image sensor 302, and when image processing is executed using only the image processor of one image sensor, it may be that the image processor of the other image sensor does not operate, that is to say, does not receive power supply or is placed under power-saving control.

The foregoing present embodiment has introduced an exemplary configuration in which the control circuit 306 of the image capturing apparatus is provided independently of the first image sensor 302 and the second image sensor 802. However, the present embodiment is not limited to this configuration, and the constituent(s) of at least a part of the control circuit 306 may be built in the first image sensor 302 or the second image sensor 802. For example, when the first image sensor 302 includes the timing signal generator circuit 303 as a built-in constituent, it supplies signals to the second image sensor 802, and the second image sensor 802 is controlled by the first image sensor 302.

Among the two image sensors, one may capture an image of visible light, whereas the other may capture an image of invisible light, such as infrared. Alternatively, among the two image sensors, one (e.g., the image sensor that captures an image of visible light) may shoot a color image, whereas the other (e.g., the image sensor that captures an image of invisible light) may shoot a black-and-white image.

Note that the first image sensor 302 and the second image sensor 802 may be connected in series to the timing signal generator circuit 303 and the control circuit 306. In this case, image data output from the second image sensor 802 is recorded to the recording circuit 305 and the like by way of the first image sensor 302. With this configuration, when image data output from the second image sensor 802 is displayed on the display circuit 308, execution of processing inside the first image sensor 302 has a risk of delaying a display timing. In order to alleviate such delay in a display timing, data may be controlled to bypass the input unit 112 and the output unit 111 in the first image sensor 302. This configuration can alleviate delay in a recording or display timing when two or more image sensors are connected in series.

Third Embodiment

A third embodiment of the present invention will now be described. An image sensor 1400 according to the third embodiment is configured differently from the image sensor 302 according to the first and second embodiments. Note that an image capturing apparatus according to the third embodiment is the same as the image capturing apparatus described in the first embodiment with reference to FIG. 3, or the image capturing apparatus described in the second embodiment using FIG. 7, except that the image sensor 302 is replaced with the later-described image sensor 1400. As other constituents are similar to the constituents described in the first and second embodiments, a description thereof will be omitted.

Figure 14:
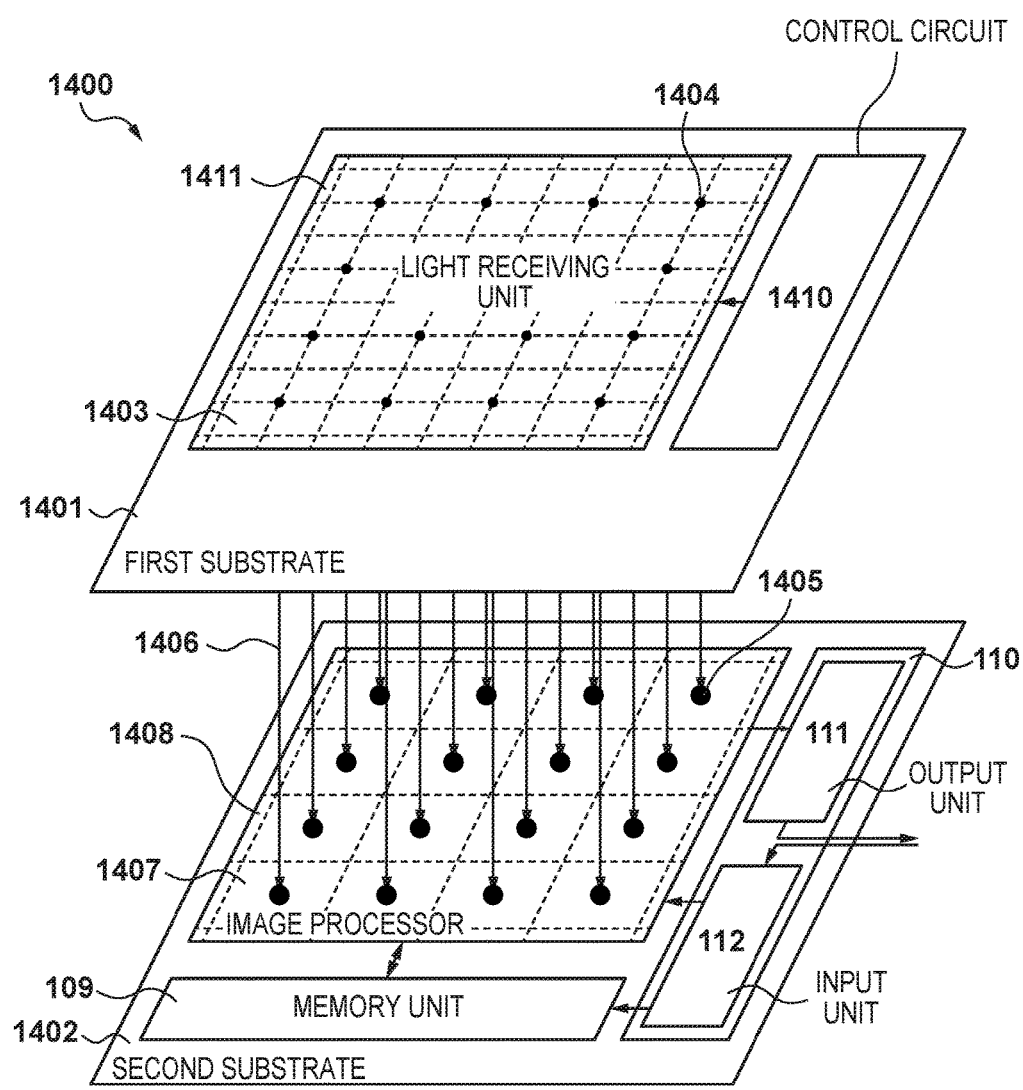
FIG. 14 is a block diagram showing a configuration of an image sensor according to a third embodiment.

FIG. 14 is a block diagram showing a configuration of the image sensor 1400 according to the third embodiment. In FIG. 14, the image sensor 1400 is structured in such a manner that a first substrate 1401 and a second substrate 1402 are stacked together. The first substrate 1401 and the second substrate 1402 are electrically connected by a plurality of through electrodes 1406 between connection units 1404 in the first substrate 1401 and connection units 1405 in the second substrate 1402; here, the connection units 1404 are provided in one-to-one correspondence with pixel sets, each of which is composed of one or more pixels, and are equal in number to the connection units 1405. These through electrodes are, for example, through-silicon vias (TSVs).

The first substrate 1401 includes a light receiving unit 1411, the connection units 1404, and a control circuit 1410. In the light receiving unit 1411, a plurality of pixels 1403 including photoelectric converters that convert light into electricity are arrayed two-dimensionally in row and column directions, and signals generated by the light receiving unit 1411 are transferred to the second substrate 1402 via the connection units 1404. The control circuit 1410 controls various types of driving in the light receiving unit 1411. In the description of the third embodiment, it will be assumed that one connection unit 1404 is provided per pixel set composed of two-by-two, or four, pixels 1403 as shown in FIG. 14.

The second substrate 1402 includes the connection units 1405, an image processor 1408, a memory unit 109, and an interface unit 110 that comprises an input unit 112 and an output unit 111. As the memory unit 109 and the constituents of the interface unit 110, i.e., the input unit 112 and the output unit 111, are similar to their counterparts described with reference to FIG. 1, a description thereof will be omitted. The connection units 1405 receive image signals transferred from the first substrate.

The image processor 1408 converts analog signals transferred from the first substrate 1401 via the connection units 1405 into digital signals. The image processor 1408 also applies various types of image processing, such as signal amplification, reference level adjustment, defective pixel correction processing and developing processing, to image data obtained through the AD conversion and to image data transferred from the memory unit 109 and the input unit 112. The image processor 1408 includes a plurality of partial image processors 1407 that are provided in one-to-one correspondence with the pixel sets each composed of two-by-two, or four, pixels 1403. A configuration of the image processor 1408 will be described later in detail using FIG. 16.

Figure 15:
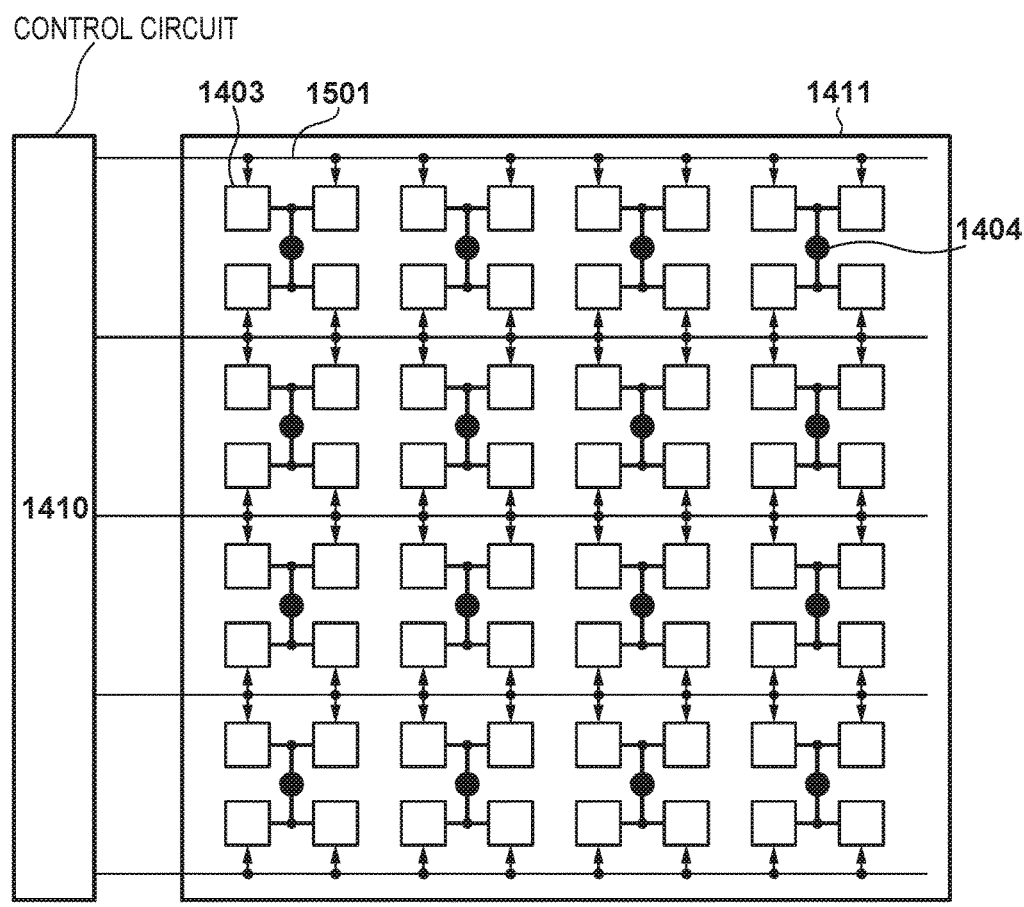
FIG. 15 is a block diagram showing a schematic configuration of a first substrate of the image sensor according to the third embodiment.

Using FIG. 15, the following provides a detailed description of the configurations of the light receiving unit 104 and nearby constituents in the image sensor 1400 according to the third embodiment. FIG. 15 is a block diagram showing a schematic configuration of the first substrate 1401 of the image sensor 1400 according to the third embodiment.

As shown in FIG. 15, the first substrate 1401 of the image sensor 1400 includes the light receiving unit 1411, in which the plurality of pixels 1403 are arranged in row and column directions, the control circuit 1410, and driving signal lines 1501. The control circuit 1410 transmits driving pulses to the pixels 1403 via the driving signal lines 1501. For simplicity, one driving signal line 1501 is provided per row, or per pair of rows, in the figure; however, in reality, a plurality of driving signal lines are connected that are appropriate for controlling the driving of the pixels 1403 on a per-pixel basis. Two-by-two, or four, pixels 1403 composing a pixel set are connected to the same connection unit 1404. The control circuit 1410 performs control so that signals generated by pixels 1403 sharing the same connection unit 1404 are not mixed with one another, and outputs the generated signals to the second substrate 1402 in order. Although the pixels 1403 composing the light receiving unit 1411 are arranged in eight rows and eight columns in FIG. 15, in reality they are arranged in a few thousand rows and a few thousand columns.

Note that constituents that are the same as the constituents of the image sensor 302 described in the first embodiment using FIGS. 1 and 2 are given the same numerals thereas, and a detailed description thereof will be omitted.

Figure 16:
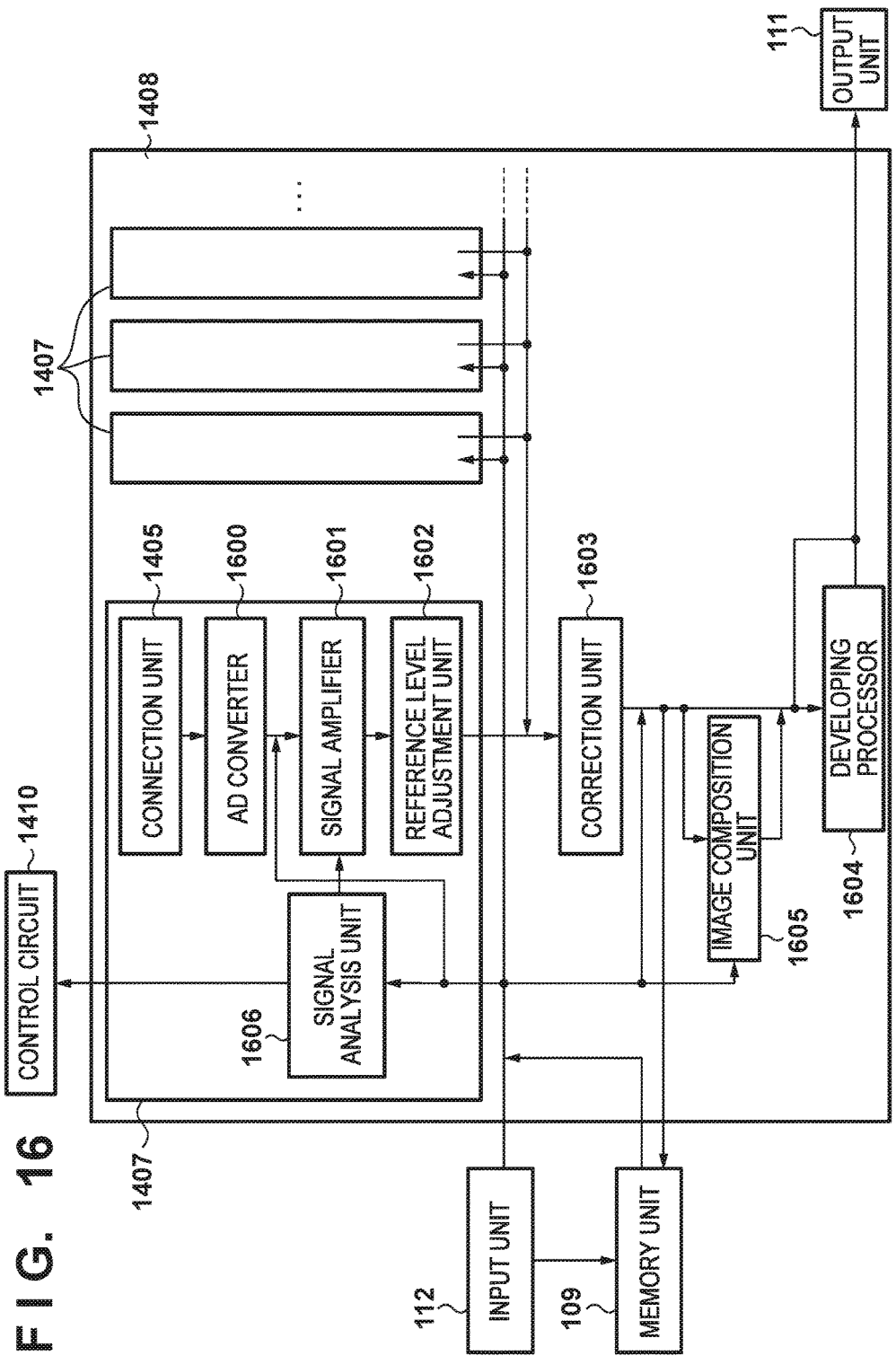
FIG. 16 is a block diagram showing a configuration of an image processor of the image sensor according to the third embodiment.

FIG. 16 is a block diagram showing a configuration of the image processor 1408 of the image sensor 1400 according to the third embodiment. In the third embodiment, the image processor 1408 is composed of the plurality of partial image processors 1407, a correction unit 1603, an image composition unit 1605, and a developing processor 1604. In an example discussed in the third embodiment, the partial image processors 1407 are provided in one-to-one correspondence with pixel sets each composed of two-by-two, or four, pixels 1403, and are each composed of a connection unit 1405, an AD converter 1600, a signal amplifier 1601, a reference level adjustment unit 1602, and a signal analysis unit 1606. The AD converter 1600 converts analog image signals from the pixels 1403, which are read out via the connection unit 1405, into digital signals (image data). Other constituents are similar to the constituents of the image processor 108 of the image sensor 302, which have been described in the first embodiment using FIG. 2, and thus a description thereof will be omitted.

Note that various types of correction processing in the correction unit 1603, image composition processing in the image composition unit 1605, and developing processing in the developing processor 1604 are executed after pieces of image data obtained through various types of image processing in the plurality of partial image processors 1407 are merged into one piece of image data.

An example of image shooting processing according to the third embodiment will now be described in detail. Hereinafter, it will be assumed that the image sensor 1400 is used in place of the first image sensor 302 in the image capturing apparatus according to the second embodiment having the configuration shown in FIG. 7, and it will be referred to as the first image sensor 1400 for distinction from the second image sensor 802. With reference to a flowchart of FIG. 13, the following describes processing executed when the second image sensor 802 is used as auxiliary means for determining image shooting conditions for the first image sensor 1400. This processing can be used when, for example, the image processor 108 included in the first image sensor 1400 calculates photometric values of a subject on the basis of output signals from the second image sensor 802, and image shooting conditions for the first image sensor 1400 are determined on the basis of the calculated photometric values.

Note that the processes of steps S1301 to S1304, in which the second image sensor 802 obtains an image and inputs its output signals to the image sensor 1400, are similar to their counterparts in the second embodiment, and thus a description thereof will be omitted.

Next, the signal analysis unit 1606 of the image processor 1408 analyzes image data from the second image sensor 802 to calculate, for example, luminance values of a subject in one-to-one correspondence with the pixels 1403 (step S1305). Then, image shooting conditions, such as a film speed, an f-number and an exposure period, for image shooting performed by the first image sensor 1400 are set on the basis of the calculation result (step S1306).

At this time, in the third embodiment, operations that support a wider dynamic range can be realized by using different image shooting conditions, such as charge accumulation periods, in the first image sensor 1400 in accordance with luminance values on the basis of the result of analysis by the signal analysis unit 1606. Specifically, pixels 1403 that presumably yield large luminance values of the subject are controlled, via the control circuit 103, to have a shorter charge accumulation period while the image sensor 1400 is exposed to light. Conversely, pixels 1403 that presumably yield small luminance values of the subject are controlled to have a longer charge accumulation period. Such control makes it possible to obtain an image that has a wider dynamic range than an image obtained at the time of normal image shooting. Furthermore, a similar advantageous effect can be achieved by controlling, for each of the subject luminances that are respectively yielded by the pixels 1403, amplification factors used by the signal amplifiers of the partial image processors 1407 on the basis of the result of analysis on the subject luminances by the signal analysis unit 1606.

The subsequent processes from the obtainment of an image to output of image data by the first image sensor 1400 (steps S1307 to S1310) are the same as their counterparts described in the second embodiment, and thus a description thereof will be omitted.

Although the image capturing apparatus according to the third embodiment has been described thus far using FIGS. 14 to 16, the present invention is not limited in this way, and may be embodied in various manners.

For example, according to the configuration of the image sensor 1400 described using FIGS. 14 and 15, two-by-two, or four, pixels 1403 composing a pixel set share a common connection unit 1404, connection unit 1405, through electrode 1406, and partial image processor 1407. However, the present invention is not limited in this way, and a larger number of pixels 1403 may share them, or one pixel 1403 may exclusively use them.

For example, according to the configuration of the image processor 1408 described using FIG. 16, each partial image processor 1407 includes the corresponding reference level adjustment unit 1602 and signal analysis unit 1606. However, the present invention is not limited in this way, and the image processor 108 may include one reference level adjustment unit and one signal analysis unit.

Although the image capturing apparatuses according to the first to third embodiments have been described thus far using FIGS. 1 to 16, the present invention is not limited in this way, and may be embodied in various manners.

For example, the image sensor 302 described using FIG. 1 is structured in such a manner that two substrates are stacked together. However, the present invention is not limited in this way, and all elements including the light receiving unit 104 and the image processor 108 may be mounted on one substrate, or three or more substrates may be stacked together.

For example, according to the configurations of the image capturing apparatuses described using FIGS. 3 and 7, the image processor 108 included in the image sensor 302 exclusively applies various types of image processing to image data generated by any image sensor, and no image processing circuit is provided outside any image sensor. However, the present invention is not limited in this way; an image processing circuit may be provided separately from the image sensor 302, and the internal image processor 108 and the external image processing circuit may share the application of various types of image processing to shot image data.

For example, according to the configuration of the image sensor 302 described using FIG. 1, the interface unit 110 uses a common terminal for outputting image data from the interface unit 110 to the outside of the image sensor 302, and for inputting image data from the outside of the image sensor 302 to the interface unit 110, in order to reduce the number of terminals. However, the present invention is not limited in this way, and an input terminal and an output terminal may be provided separately and independently of each other. Especially when image signals are frequently input to the first image sensor 302 as in the second embodiment, it is preferable to provide the input terminal and the output terminal separately instead of using a common terminal for input and output.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-230028, filed on Nov. 25, 2015 and Japanese Patent Application No. 2016-175882, filed on Sep. 8, 2016, which are hereby incorporated by reference herein in their entirety.

What is claimed is:

1. An image sensor having a first semiconductor substrate and a second semiconductor substrate being stacked on each other,
   wherein the first semiconductor substrate includes:
      a plurality of photoelectric converters, and
      at least one analog/digital converter which converts analog image signals generated by the plurality of photoelectric converters to first image data, and
   wherein the second semiconductor substrate includes:
      an input interface to which second image data is input from outside of the image sensor,
      an image processor that applies image processing to the first image data or the second image data, and an output interface for outputting, to the outside of the image sensor, the first or second image data to which the image processing was applied by the image processor.

2. The image sensor according to claim 1, wherein the first semiconductor substrate and the second semiconductor substrate are provided in one package.

3. The image sensor according to claim 1, wherein a timing of image capture by the plurality of photoelectric converters differs from a timing at which the second image data is input from the outside of the image sensor to the input interface.

4. The image sensor according to claim 1, further comprising a supply connection that supplies the first image data to the image processor, the supply connection being independent of the input interface.

5. The image sensor according to claim 1, wherein the second image data input from the input interface is used in at least one of display, recording, and analysis.

6. The image sensor according to claim 1, wherein the image processor applies developing processing to the second image data input from the input interface.

7. The image sensor according to claim 1, wherein the image processor executes composition processing for compositing together the first image data obtained from the analog/digital converter and the second image data input from the input interface.

8. The image sensor according to claim 7, wherein in the composition processing, the image processor amplifies the first image data obtained from the analog/digital converter and the second image data input from the input interface with different gains.

9. The image sensor according to claim 7, wherein in the composition processing, the image processor averages the first image data obtained from the analog/digital converter and the second image data input from the input interface.

10. The image sensor according to claim 1, wherein the image processor subtracts the second image data input from the input interface from the first image data obtained from the analog/digital converter.

11. The image sensor according to claim 1, wherein the image processor is provided in plurality in one-to-one correspondence with photoelectric converter sets each composed of a plurality of photoelectric converters.

12. The image sensor according to claim 11, further comprising a plurality of connection units that are provided in one-to-one correspondence with photoelectric converter sets each composed of a preset number of photoelectric converters,
wherein the image processors are provided in one-to-one correspondence with the plurality of connection units.

13. The image sensor according to claim 1, wherein a common terminal serves as both a constituent of the input interface and a constituent of the output interface.

14. The image sensor according to claim 1, wherein the first semiconductor substrate and the second semiconductor substrate are electrically connected to each other.

15. The image sensor according to claim 1, wherein the at least one analog/digital converter is arranged either on the first semiconductor substrate or the second semiconductor substrate.

16. An image capturing apparatus, comprising:
an image sensor having a first semiconductor substrate and a second semiconductor substrate being stacked on each other,
wherein the first semiconductor substrate includes:
a plurality of photoelectric converters, and
at least one analog/digital converter which converts analog image signals generated by the plurality of photoelectric converters to first image data, and
wherein the second semiconductor substrate includes:
an input interface to which second image data is input from outside of the image sensor,
an image processor that applies image processing to the first image data or the second image data, and
an output interface for outputting, to the outside of the image sensor, the first or second image data to which the image processing was applied by the image processor;
a display processor for the first or second image data output from the image sensor; and
a recording processor.

17. The image capturing apparatus according to claim 16, wherein the at least one analog/digital converter is arranged either on the first semiconductor substrate or the second semiconductor substrate.

18. An image capturing apparatus, comprising:
a first image sensor; and
a second image sensor,
wherein the first image sensor includes:
a plurality of photoelectric converters,
at least one analog/digital converter which converts analog image signals generated by the plurality of photoelectric converters to first image data,
an input interface to which second image data is input from outside,
an image processor, and
an output interface for outputting, to the outside, the first or second image data to which image processing was applied by the image processor,
wherein the second image sensor includes:
a plurality of photoelectric converters, and
an analog/digital converter which converts analog image signals generated by the plurality of photoelectric converters to the second image data, and
wherein the image processor applies image processing to at least the second image data input from the second image sensor to the input interface of the first image sensor.

19. The image capturing apparatus according to claim 18, further comprising a controller that controls the first image sensor and the second image sensor.

20. The image capturing apparatus according to claim 18, wherein the plurality of photoelectric converters, the analog/digital converter, the input interface, the image processor, and the output interface of the first image sensor are provided in one package.

21. The image capturing apparatus according to claim 18, wherein a timing of image capture by the plurality of photoelectric converters of the first image sensor differs from a timing at which the second image data is input from the outside of the first image sensor to the input interface.

22. The image capturing apparatus according to claim 18, wherein the second image data input from the input interface is used in at least one of display, recording, and analysis.

23. The image capturing apparatus according to claim 18, wherein the image processor applies developing processing to the second image data input from the input interface.

24. The image capturing apparatus according to claim 18, wherein the image processor applies the image processing to first image data obtained from the first image sensor.

25. The image capturing apparatus according to claim 18, wherein the image processor executes composition processing for compositing together first image data obtained from the analog/digital converter of the first image sensor and the second image data input from the input interface.

26. The image capturing apparatus according to claim 18, wherein the first image sensor shoots a still image, and the second image sensor shoots a video.

27. The image capturing apparatus according to claim 18, wherein the first image sensor shoots a video, and the second image sensor shoots a still image.

28. The image capturing apparatus according to claim 18, wherein the first image sensor and the second image sensor shoot images of the same subject with predetermined parallax.

29. The image capturing apparatus according to claim 18, wherein the first image sensor and the second image sensor shoot videos with different frame phases.

30. The image capturing apparatus according to claim 18, wherein the analog/digital converter and the image processor of the first image sensor are configured on different substrates that are stacked together, and are electrically connected to each other.

31. The image capturing apparatus according to claim 18, further comprising:
   a display processor for image data; and
   a recording processor.

* * * * *